US008548468B2

(12) United States Patent
Jin et al.

(10) Patent No.: US 8,548,468 B2
(45) Date of Patent: Oct. 1, 2013

(54) METHOD FOR PROVIDING SERVICE OF FEMTOCELL, AND TRANSMITTER AND RECEIVER FOR THE SAME

(75) Inventors: Sung-Geun Jin, Daejeon (KR); Sung Cheol Chang, Daejeon (KR); Won-Ik Kim, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/219,584

(22) Filed: Aug. 26, 2011

(65) Prior Publication Data

US 2011/0312324 A1   Dec. 22, 2011

Related U.S. Application Data

(63) Continuation of application No. PCT/KR2010/001260, filed on Feb. 26, 2010.

(30) Foreign Application Priority Data

Feb. 27, 2009 (KR) .................. 10-2009-0017191
Feb. 26, 2010 (KR) .................. 10-2010-0018001

(51) Int. Cl.
*H04W 4/00* (2009.01)
*H04W 40/00* (2009.01)
*H04W 72/00* (2009.01)
*H04B 1/38* (2006.01)

(52) U.S. Cl.
USPC ............... 455/435.1; 455/435.3; 455/449; 455/452.2; 455/561; 370/328; 370/329

(58) Field of Classification Search
USPC ........ 455/435, 435.1–435.3, 444, 449–452.2, 455/432.1, 422.1, 436, 560, 561; 370/252, 370/254, 312, 328–333, 338
See application file for complete search history.

(56) References Cited

U.S. PATENT DOCUMENTS

2003/0064730 A1    4/2003  Chen et al.
2008/0076386 A1*   3/2008  Khetawat et al. ............. 455/410
(Continued)

FOREIGN PATENT DOCUMENTS

JP   2003-179966   6/2003
JP   2009-021652   1/2009
(Continued)

OTHER PUBLICATIONS

International Search Report for PCT/KR2010/001260 filed on Feb. 26, 2010.
(Continued)

*Primary Examiner* — Marisol Figueroa
*Assistant Examiner* — Erica Navar

(57) ABSTRACT

A service method of a femtocell for simultaneously providing a plurality of femto services to a plurality of mobile stations, and a transmitter and receiver for the same. When a femto advanced base station supports a plurality of femtocell subscription types, and it simultaneously provides data services with different qualities to mobile stations having subscribed to different femtocells. The femtocell subscription type supported by the femto advanced base station is advertised to the mobile station through an identifier at a PHY level or an identifier at a MAC level. A CSG-closed femtocell provides a high-quality data service to limited subscribers, a CSG-open femtocell provides a relatively low quality data service to limited subscribers, and an OSG femtocell provides the lowest quality data service to all mobile stations irrespectively of subscription states.

16 Claims, 5 Drawing Sheets

(56) References Cited

U.S. PATENT DOCUMENTS

| | | |
|---|---|---|
| 2008/0076419 A1 | 3/2008 | Khetawat et al. |
| 2008/0096553 A1 | 4/2008 | Saksena et al. |
| 2008/0132239 A1 | 6/2008 | Khetawat et al. |
| 2008/0267153 A1 | 10/2008 | Mukherjee et al. |
| 2009/0070694 A1* | 3/2009 | Ore et al. .............. 715/764 |
| 2009/0303948 A1 | 12/2009 | Tanigawa et al. |
| 2009/0305671 A1* | 12/2009 | Luft et al. .............. 455/411 |
| 2009/0323634 A1 | 12/2009 | Kim et al. |
| 2010/0165942 A1* | 7/2010 | Liao et al. .............. 370/329 |

FOREIGN PATENT DOCUMENTS

| | | |
|---|---|---|
| KR | 10-2008-0016316 A | 2/2008 |
| KR | 1020090049389 A | 5/2009 |
| WO | WO 2008/035720 A1 | 3/2008 |
| WO | WO 2009/075467 A1 | 6/2009 |

OTHER PUBLICATIONS

Written opinion of the International Searching Authority for PCT/KR2010/001260 filed on Feb. 26, 2010.

"CSG with limited open access", NTT DoCoMo, T-Mobile, Nov. 5-9 2007, 3GPP TSG RAN WG2 #60, Tdoc-R2-075150, Jeju, Republic of Korea.

"Admission control and rate control for hybrid access mode", Nortel, Feb. 16-20, 2009, 3GPP TSG SA WG2 Meeting #71, TD S2-091573, Budapest, Hungary.

* cited by examiner

METHOD FOR PROVIDING SERVICE OF FEMTOCELL, AND TRANSMITTER AND RECEIVER FOR THE SAME

CROSS-REFERENCE TO RELATED APPLICATION

This application is a continuation of PCT application No. PCT/KR2010/001260, filed on Feb. 26, 2010, which claims priority to and the benefit of Korean Patent Application No. 10-2009-0017191 filed on Feb. 27, 2009 and Korean Patent Application No. 10-2010-0018001 filed on Feb. 26, 2010, the entire contents of which are incorporated herein by reference.

BACKGROUND (a) Field

Embodiments of the present invention relate to a method for providing a service of a femtocell for simultaneously providing a plurality of femto services to a plurality of mobile stations, and a transmitter and receiver for the same.

(b) Description of the Related Art

A femtocell provides a wireless service to an area with the cell radius of less than 30 meters. A femto advanced base station represents a very small base station that is installed to support the femtocell within a macrocell, and it provides excellent signal quality compared to a macrocell base station in a concentrated area with houses or office buildings.

The femto advanced base station serves an open subscriber group (OSG) such as public users, or serves a closed subscriber group (CSG) such as subscribers who are authenticated by owners of femtocell base stations or network service providers.

The femto advanced base station determines to be operable as one of an OSG femto advanced base station and a CSG femto advanced base station, and broadcasts an operation method of the femto advanced base station to the mobile station of a serving cell. When the mobile station determines that the operation method of the femto advanced base station is the femtocell method to which the mobile station has registered, the mobile station registers to the femto advanced base station to receive a data service based on the femtocell method.

However, since the current femtocell does not support simultaneous registration to different femto methods, the mobile station cannot be served with the femtocell service when the base station of the femtocell in which the mobile station is provided does not support the femtocell operation method to which the mobile station is registered.

SUMMARY

Embodiments of the present invention provide a femto advanced base station for supporting a plurality of femto registration methods, and an operation process between a femto advanced base station and a mobile station.

An embodiment of the present invention provides a method for a femtocell to provide a service in a method for a femto advanced base station to provide a data service, including: the femto advanced base station providing information on a plurality of femtocell subscription types to mobile stations in a serving cell; receiving a registration request from a first mobile station having designated a first subscription type from among the femtocell subscription types and a second mobile station having designated a second subscription type; and providing a data service with quality corresponding to the first subscription type to the first mobile station, and providing a data service with quality corresponding to the second subscription type to the second mobile station.

Another embodiment of the present invention provides a receiver of a femtocell, including: a memory for storing an identifier of a femtocell subscription type to which the receiver is subscribed; and a controller including a comparison module for, when receiving information on a plurality of femtocell subscription types from a femto advanced base station, checking whether the femtocell subscription type information includes the identifier stored in the memory and a registration module for requesting registration from the femto advanced base station according to a femtocell subscription type that corresponds to the identifier stored in the memory.

In the embodiments of the present invention, the femto advanced base station can support at least subscription types from among the CSG-closed femto method, the CSG-open femto method, and the OSG femto method.

The femtocell subscription type information can be identified by a receiver through a PHY level and/or a MAC level, and particularly, femtocell subscription type information of the MAC level can be broadcast to the receivers in the femtocell or unicast by a request of a specific receiver.

According to the embodiments of the present invention, a single femtocell provides a plurality of different femto services by providing different unicast qualities according to the respective femto services.

DETAILED DESCRIPTION

In general, a communication system includes a transmitter and a receiver. The transmitter and the receiver can be called a transceiver for simultaneously performing a transmitting function and a receiving function. For ease of description, a first part for providing a femto data service will be defined to be a transmitter and a second part for entering a service area covered by the transmitter and receiving the femto data service will be called a receiver.

The transmitter can be referred to as a base station (BS) or an advanced base station (ABS), and the receiver as a mobile station (MS) or an advanced mobile station (AMS).

Throughout the specification, a femto service indicates a data service that is provided distinctively according to a subscription type to the femtocell.

Embodiments of the present invention will be described with reference to accompanying drawings.

<A Network Topology of a Communication Network>

Figure 1:
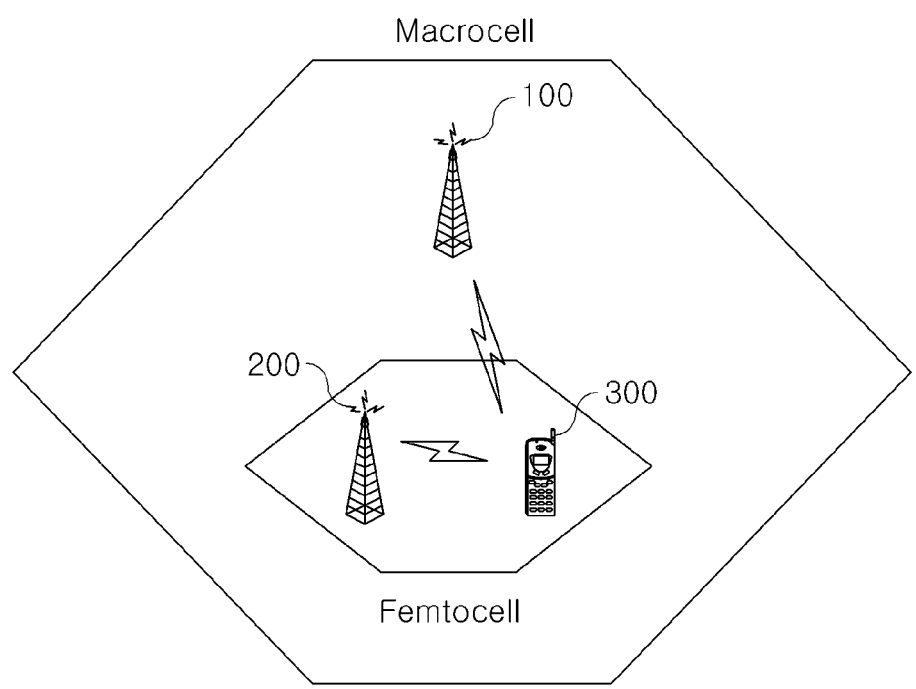
FIG. 1 shows a configuration of a communication network according to embodiments of the present invention.

FIG. 1 shows a configuration of a communication network according to embodiments of the present invention.

The communication network of FIG. 1 provides a macrocell service and a femtocell service. A transmitter for the macrocell will be referred to as a macro base station 100 and another transmitter for the femtocell will be called a femto advanced base station 200.

The femto advanced base station 200 uses an air interface overlapped on the macro base station 100 to exchange a control message. The femto advanced base station 200 registers itself and the macro base station 100 to the network to directly receive radio link configuration information from the network.

A mobile station 300 enters the network of the macro base station or that of the femto advanced base station depending on a subscription state to the femtocell service and a support state of the femtocell service.

The femto advanced base station 200 supports at least one of the following subscription types, and can simultaneously support two or more.

a) Closed subscriber group-closed femto advanced base station (CSG-closed femto ABS): provides high-speed data service to a limited subscriber group.

b) Closed subscriber group-open femto ABS: provides low-speed data service to a limited subscriber group.

c) Open subscriber group femto ABS: provides a data service regardless of service registration and provides the same with the lowest-quality data service.

The femto advanced base station 200 broadcasts information on femto service subscription types provided by the femto advanced base station 200 to the mobile stations 300 in the serving cell, or unicasts it according to a request from the mobile station 300.

The mobile station 300 providing the femto service receives a femtocell information list (e.g., CSG white list) from the femto advanced base station 200, and attempts to enter the network of the corresponding femto advanced base station 200 when it is found that the mobile station 300 has subscribed to the femto service.

<Network Entry>

Figure 2:
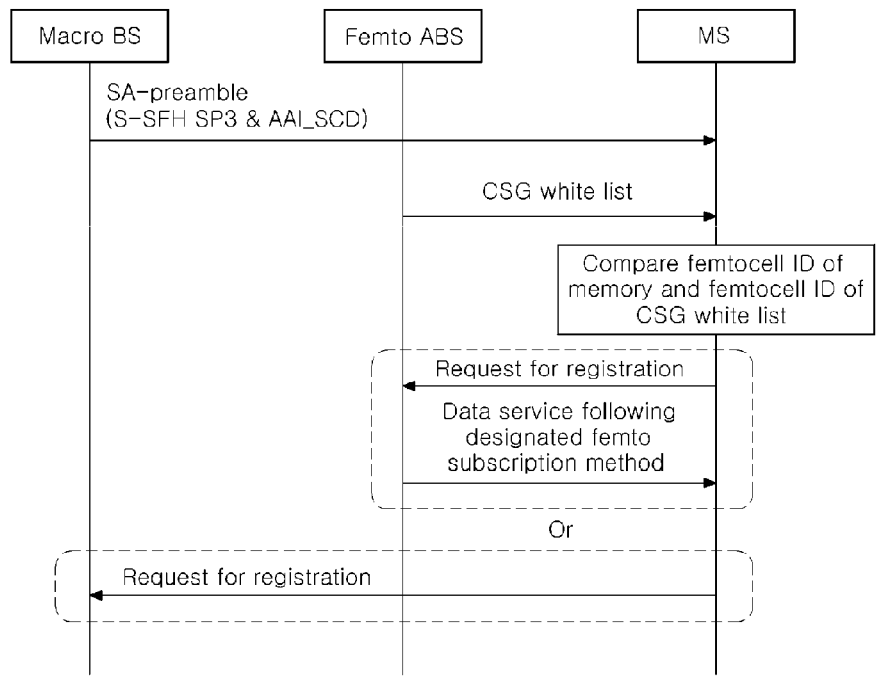
FIG. 2 shows a data flowchart among a macro base station, a femto advanced base station, and a mobile station for entering a femtocell network.

FIG. 2 shows a data flowchart among a macro base station, a femto advanced base station, and a mobile station for entering a femtocell network.

When the mobile station is turned on, it enters an initialization state. While in the initialization state, radio interface parameters are configured and time and frequency are synchronized.

In the initialization state, the mobile station receives various control information from the macro base station through a preamble sequence. Particularly, a primary advanced (PA) preamble sequence and a secondary advanced (SA) preamble sequence are used to control the downlink.

Figure 3:
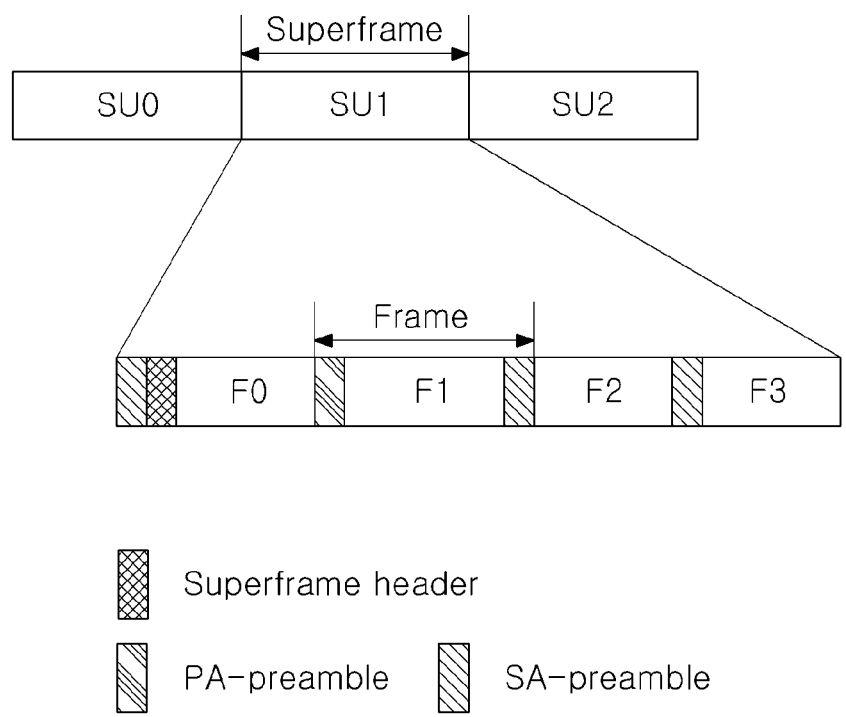
FIG. 3 shows a data structure of a superframe including A-preambles.

FIG. 3 shows a data structure of a superframe including A-preambles. Referring to FIG. 3, a first symbol of a frame is specified as an A-preamble symbol. The PA-preamble is positioned at the first symbol of the second frame in a superframe, and the SA-preamble is positioned at the first symbol of three other frames.

The SA-preamble sequences are divided into a plurality of partitions that are dedicated to the base stations including the macrocell ABS, the macro hot zone ABS, and the femto ABS. For example, the femto advanced base station can be allocated to be dedicated to the 3rd sub-partition (SP3) of an S-SFH. The base stations except the macrocell base station are called non-macro base stations.

At the PHY level, non-macro base station information can be broadcast in a hierarchical configuration formed with a secondary-superframe header (S-SFH) of the SA-preamble sequence and an advanced air interface_system configuration descriptor (AAI_SCD) message. Here, the S-SFH is a non-macro base station cell type and is partitioned for a public base station or a CSG femto advanced base station, and the AAI_SCD message is partitioned for the public base station and CSG femto advanced base station. The public base station can be classified as a hot zone, a relay, and an OSG, and the CSG femto advanced base station can be classified as a CSG-closed femto advanced base station and a CSG-open femto advanced base station.

The mobile station identifies the femto advanced base station at the PHY level, and can also identify the femto advanced base station at a MAC level.

That is, at the MAC level, non-macro base station information can be provided to the mobile station by use of a femtocell information list (e.g., CSG white list). The femtocell information list can be broadcast to the mobile stations in the cell, and it can also be provided according to a request of the mobile station.

The femtocell information list displays types of the femto services provided by the femto advanced base station. The mobile station receives the femtocell information list from the femto advanced base station, and checks whether the femto service to which the mobile station is registered is included in the femtocell information list. If included, the mobile station enters the network of the corresponding femto advanced base station, and if not, it enters the network of the macrocell base station.

<The Configuration of the Femto Advanced Base Station (ABS)>

Figure 4:
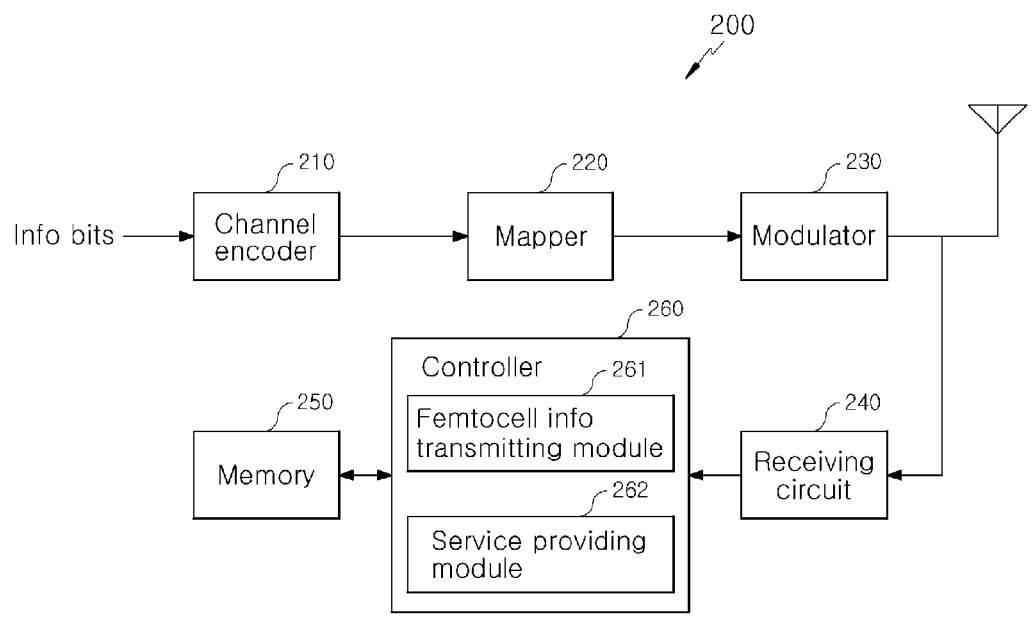
FIG. 4 shows a configuration of a femto advanced base station according to an embodiment of the present invention.

FIG. 4 shows a configuration of a femto advanced base station 200 according to an embodiment of the present invention. Referring to FIG. 4, the femto advanced base station 200 includes a channel encoder 210, a mapper 220, a modulator 230, a receiving circuit 240, a memory 250, and a controller 260.

The channel encoder 210 encodes streams of information bits according to a predetermined coding scheme to generate coded data.

The mapper 220 maps the coded data output by the channel encoder 110 on symbols that are represented with the positions following the constellation of the amplitude and the phase. The modulation scheme includes the m-quadrature phase shift keying (m-PSK) and the m-quadrature amplitude modulation (m-QAM).

The modulator 230 modulates the mapped unicast symbols according to a predetermined multiple access modulation. The multiple access modulation scheme includes single-carrier modulation schemes such as the CDMA and the multi-carrier modulation schemes such as the OFDM.

The receiving circuit 240 receives the unicast signals from the receiver through an antenna, generates them into digital signals, and transmits them to the controller 260.

The memory 250 stores system information for operating the femto advanced base station 200 and the femtocell information list.

The controller 260 controls the femto advanced base station 200, and particularly it includes a femtocell information transmitting module 261 and a service providing module 262.

The femtocell information transmitting module 261 broadcasts the femtocell information list to the mobile stations in the cell, or unicasts the femtocell information list to the corresponding mobile station through the receiving circuit 240 when the mobile station requests information.

The service providing module 262 provides the data service with the quality corresponding to the femto service to which the mobile station 300 is subscribed to the mobile stations 300 in the serving cell. When the femto advanced base station 200 provides a plurality of femto subscription types and the mobile stations 300 in the serving cell are subscribed to different femto services, the service providing module 262 provides the data service with different quality to the mobile stations 300 according to the multiple access modulation so that the mobile stations 300 may correspond to the subscribed femto services. The service with the different quality has quality of service (QoS) parameters including different priority.

<Configuration of the Mobile Station (AMS)>

Figure 5:
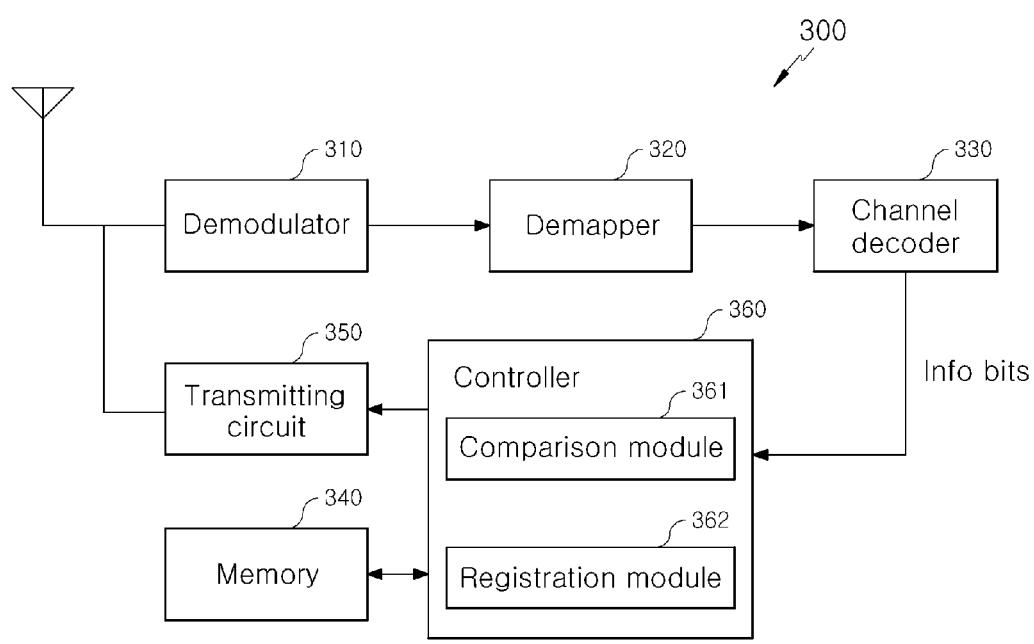
FIG. 5 shows a configuration of a mobile station according to an embodiment of the present invention.

FIG. 5 shows a configuration of a mobile station 300 according to an embodiment of the present invention. In FIG. 5, the mobile station 300 includes a channel decoder 310, a demapper 320, a demodulator 330, a memory 340, a transmitting circuit 350, and a controller 360.

The demodulator 330, the demapper 320, and the channel decoder 310 of the mobile station 300 perform reverse functions of the above-described modulator 230, mapper 220, and channel encoder 210 of the femto advanced base station 200. That is, the signal received through the antenna is demodulated by the demodulator 330, and is demapped by the demapper 320 to be encoded data. The encoded data are decoded by the channel decoder 310. The demodulator 330, the demapper 320, and the channel decoder 310 can be called a receiving circuit (not shown) overall.

The memory 340 stores system information required for operating the mobile station 300 and an identifier of the femto service to which the mobile station is subscribed.

The transmitting circuit 350 generates the various data provided by the controller 360 into analog data, and transmits the same to the femto advanced base station 200 or the macro base station 100 through the antenna.

The controller 350 controls the mobile station 300, and includes a comparison module 351 for checking whether the femtocell subscription type information includes the identifier stored in the memory when receiving information on a plurality of femtocell subscription types from the femto advanced base station 200, and a registration module 352 for requesting registration from the femto advanced base station 200 according to the femtocell subscription type that corresponds to the identifier stored in the memory. When the femtocell subscription type information does not include the identifier stored in the memory, the registration module 352 can request registration from the macrocell base station 100 other than the femto advanced base station 200.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The embodiments of the present invention are applicable to a service providing method of a femtocell for simultaneously providing a femto service to a plurality of mobile stations, and a transmitter and receiver for the same method.

The above-described embodiments can be realized through a program for realizing functions corresponding to the configuration of the embodiments or a recording medium for recording the program in addition to through the above-described device and/or method, which is easily realized by a person skilled in the art.

What is claimed is:

1. A method for providing a service in a femto advanced base station, the method comprising:
    performing a first network entry procedure with a first mobile station that belongs to a closed subscriber group;
    performing a second network entry procedure with a second mobile station that does not belong to the closed subscriber group;
    providing a service to the first mobile station; and
    providing a service with a lower priority than the service provided to the first mobile station to the second mobile station,
    wherein, among a plurality of types including a first type for providing a service to only mobile stations that belong to the closed subscriber group, a second type for providing a service to any mobile station, and a third type for providing a service to the mobile stations that belong to the closed subscriber group and providing a service with the lower priority to mobile stations that do not belong to the closed subscriber group, the femto advanced base station is configured to operate as the third type,
    wherein information on the plurality of types is provided by a physical (PHY) level identifier, and
    wherein the PHY level identifier is provided by at least one of a superframe header and a system configuration descriptor message.

2. The method of claim 1,
    wherein the PHY level identifier is included in a secondary advanced (SA) preamble sequence.

3. The method of claim 1, wherein the femto advanced base station that is entered by each mobile station is identified by a medium access control (MAC) level identifier, and
    wherein the MAC level identifier is included in a closed subscriber group (CSG) white list.

4. The method of claim 1, wherein the service with the lower priority has quality of service (QoS) parameters including the lower priority than the service provided to the first mobile station.

5. A method for entering a femtocell in a mobile station, the method comprising:
    performing a network entry procedure with a femtocell advanced base station;
    receiving a service with a priority that is determined based on whether the mobile station belongs to a closed subscriber group of the femtocell advanced base station; and
    receiving a message including information on a plurality of types for femtocell advanced base stations,
    wherein the plurality of types includes a first type for providing a service to only mobile stations that belong to the closed subscriber group, a second type for providing a service to any mobile station, and a third type for providing a service mobile stations that belong to the closed subscriber group and providing a service with a lower priority to mobile stations that do not belong to the closed subscriber group,
    wherein the femto advanced base station is configured to operate as the third type,
    wherein information on the plurality of types is provided by a physical (PHY) level identifier, and
    wherein the PHY level identifier is provided by at least one of a superframe header and a system configuration descriptor message.

6. The method of claim 5, wherein receiving the service includes receiving the service with a higher priority than a service provided to another mobile station that does not belong to the closed subscriber group if the mobile station belongs to the closed subscriber group.

7. The method of claim 5, wherein receiving the service includes receiving the service with a lower priority than a service provided to another mobile station that belongs to the closed subscriber group if the mobile station does not belong to the closed subscriber group.

8. The method of claim 7, wherein the service with the lower priority has quality of service (QoS) parameters including the lower priority than the service provided to the mobile station that belongs to the closed subscriber group.

9. The method of claim 5,
wherein the PHY level identifier is included in a secondary advanced (SA) preamble sequence.

10. The method of claim 5, wherein the femto advanced base station that is entered by the mobile station is identified by a medium access control (MAC) level identifier, and
wherein the MAC level identifier is included in a closed subscriber group (CSG) white list.

11. A femto advanced base station, comprising:
a receiving circuit configured to perform a first network entry procedure with a first mobile station that belongs to a closed subscriber group, and to perform a second network entry procedure with a second mobile station that does not belong to the closed subscriber group; and
a controller configured to provide a service to the first mobile station, and to provide a service with a lower priority than the service provided to the first mobile station to the second mobile station,
wherein, among a plurality of types including a first type for providing a service to only mobile stations that belong to the closed subscriber group, a second type for providing a service to any mobile station, and a third type for providing a service to the mobile stations that belong to the closed subscriber group and providing a service with the lower priority to mobile stations that do not belong to the closed subscriber group, the femto advanced base station is configured to operate as the third type,
wherein information on the plurality of types is provided by a physical (PHY) level identifier, and
wherein the PHY level identifier is provided by at least one of a superframe header and a system configuration descriptor message.

12. The femto advanced base station of claim 11, wherein the service with the lower priority has quality of service (QoS) parameters including the lower priority than the service provided to the first mobile station.

13. A mobile station, comprising:
a controller configured to perform a network entry procedure with a femtocell advanced base station; and
a receiving circuit configured to receive a service with a priority that is determined based on whether the mobile station belongs to a closed subscriber group of the femtocell advanced base station,
wherein, among a plurality of types including a first type for providing a service to only mobile stations that belong to the closed subscriber group, a second type for providing a service to any mobile station, and a third type for providing a service to the mobile stations that belong to the closed subscriber group and providing a service with the lower priority to mobile stations that do not belong to the closed subscriber group, the femto advanced base station is configured to operate as the third type,
wherein information on the plurality of types is provided by a physical (PHY) level identifier, and
wherein the PHY level identifier is provided by at least one of a superframe header and a system configuration descriptor message.

14. The mobile station of claim 13, wherein the receiving circuit is configured to receive a service with a higher priority than a service provided to another mobile station that does not belong to the closed subscriber group if the mobile station belongs to the closed subscriber group.

15. The mobile station of claim 13, wherein the receiving circuit is configured to receive a service with a lower priority than a service provided to another mobile station that belongs to the closed subscriber group if the mobile station does not belong to the closed subscriber group.

16. The mobile station of claim 15, wherein the service with the lower priority has quality of service (QoS) parameters including the lower priority than the service provided to the mobile station that belongs to the closed subscriber group.

\* \* \* \* \*